Jan. 15, 1963  G. P. McGRAW, JR  3,073,008
CAPACITOR WINDING APPARATUS
Filed Feb. 8, 1961  5 Sheets-Sheet 1

INVENTOR
G. P. McGRAW, JR.
BY A.C. Schwarz, Jr.
ATTORNEY

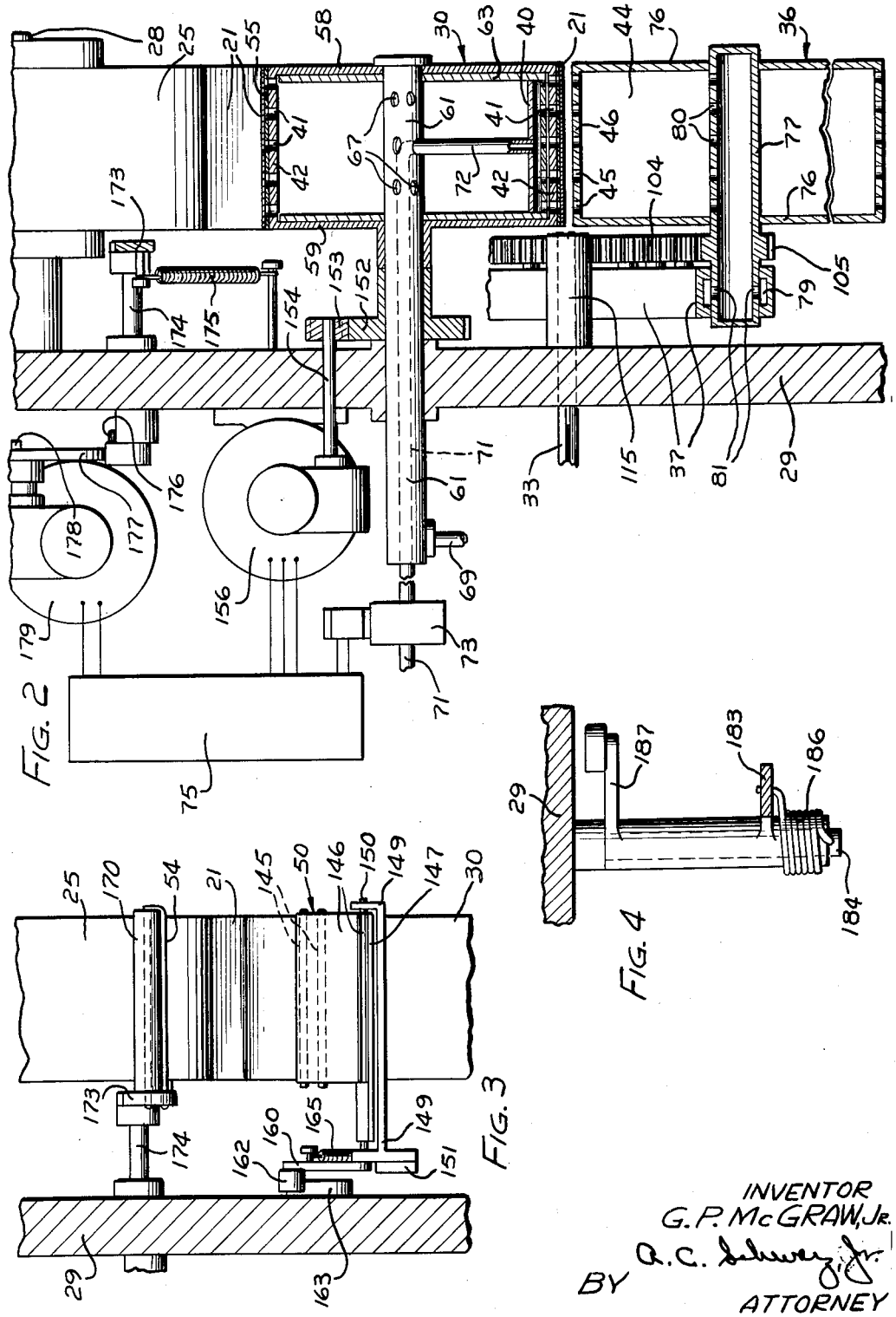

Jan. 15, 1963    G. P. McGRAW, JR    3,073,008
CAPACITOR WINDING APPARATUS
Filed Feb. 8, 1961    5 Sheets-Sheet 3
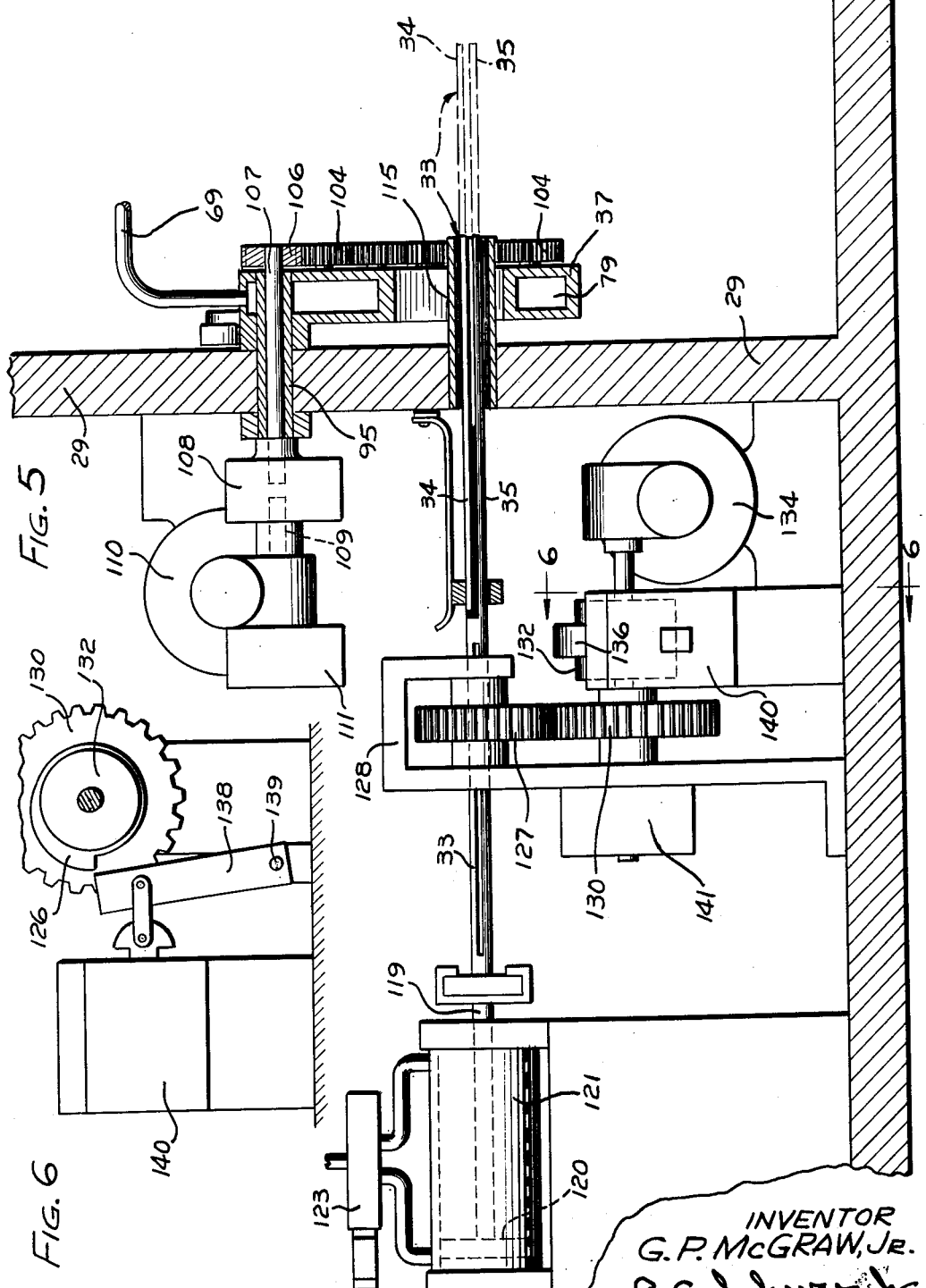
INVENTOR
G. P. McGRAW, Jr.
BY A.C. Schwarz Jr.
ATTORNEY Jan. 15, 1963  G. P. McGRAW, JR  3,073,008
CAPACITOR WINDING APPARATUS
Filed Feb. 8, 1961  5 Sheets-Sheet 4
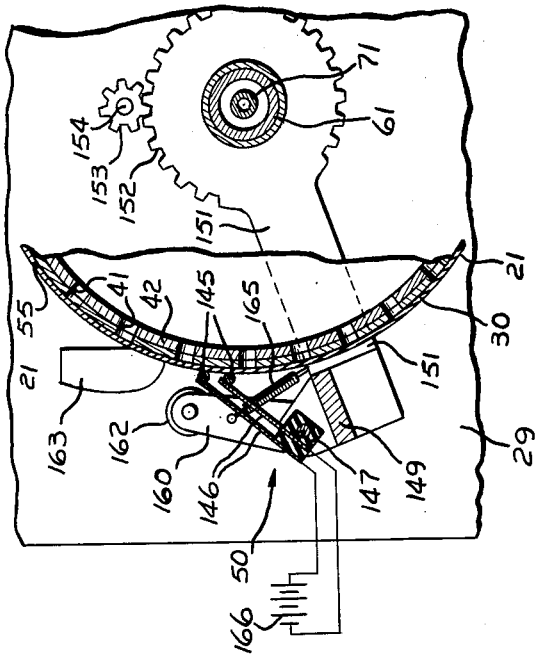
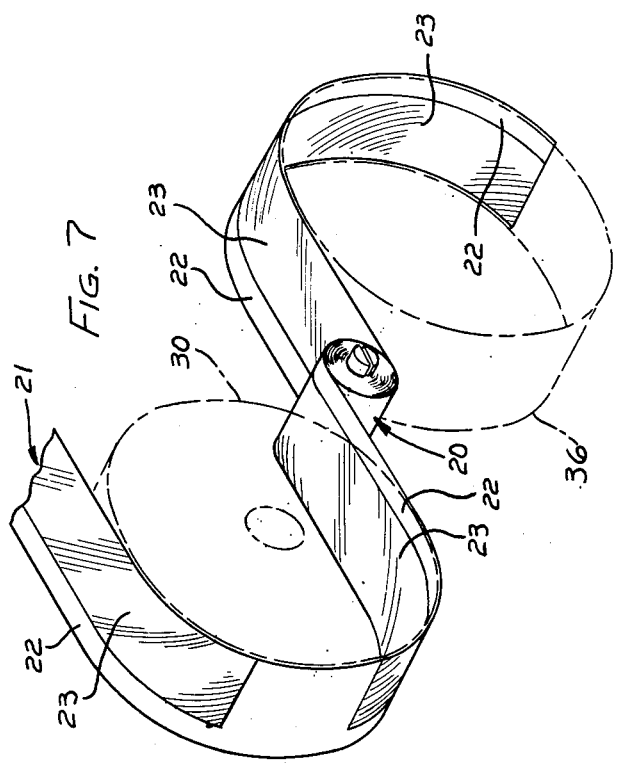
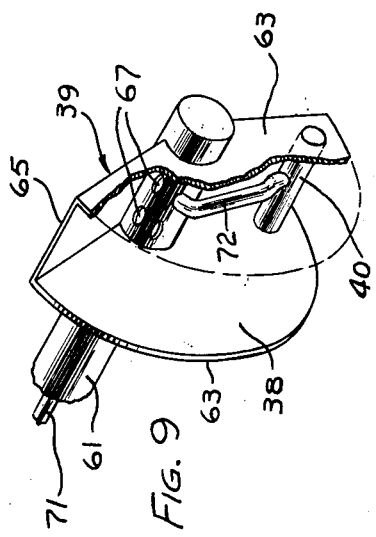
INVENTOR
G. P. McGRAW, JR.
BY
ATTORNEY

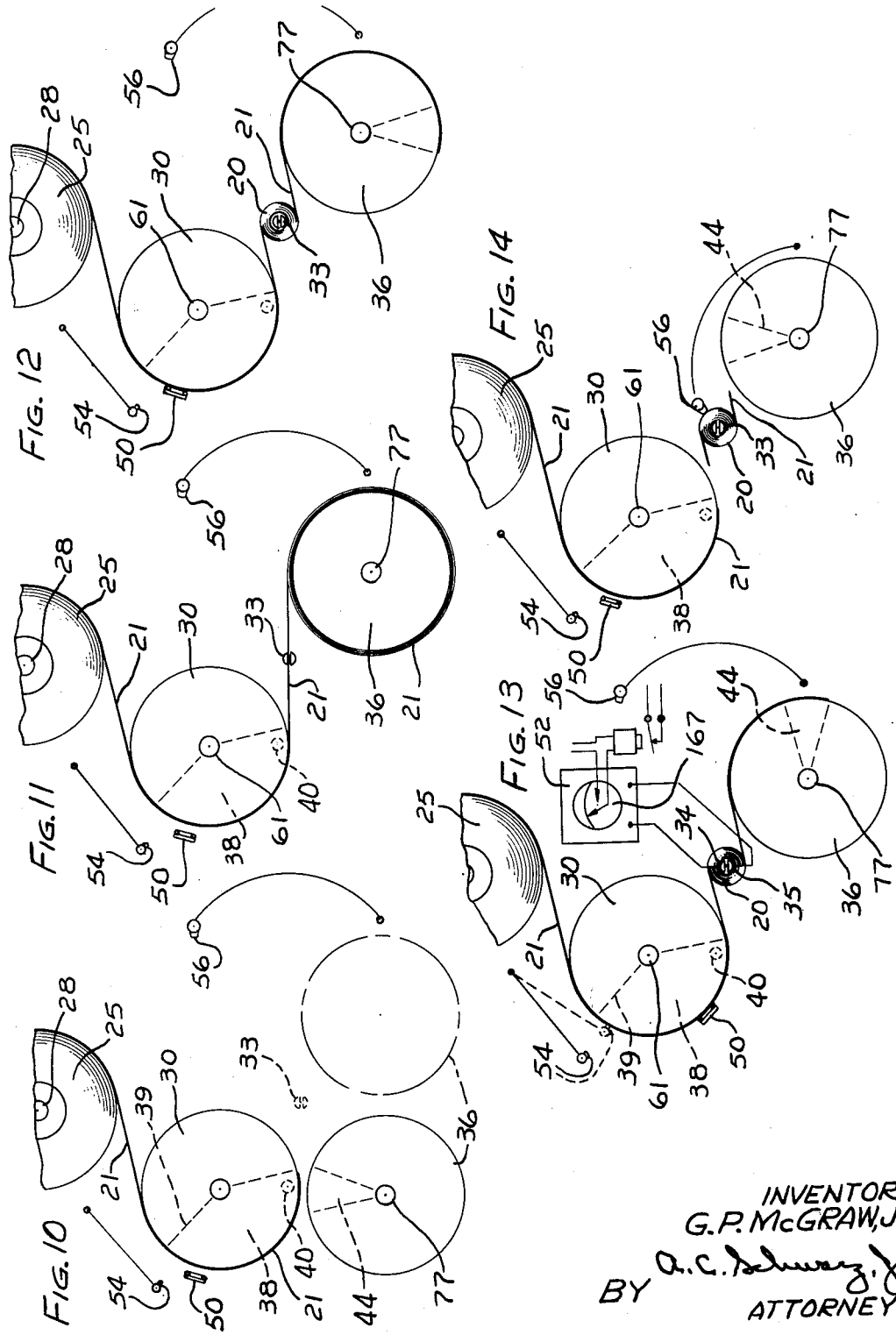

ns patent Office 3,073,008
Patented Jan. 15, 1963

3,073,008
CAPACITOR WINDING APPARATUS
George P. McGraw, Jr., Downers Grove, Ill., assignor to Western Electric Company, Incorporated, New York, N.Y., a corporation of New York
Filed Feb. 8, 1961, Ser. No. 87,895
7 Claims. (Cl. 29—25.42)

This invention relates to capacitor winding apparatus, and more particularly to apparatus for center winding a strip of capacitor-forming material to form capacitors.

An object of the present invention is to provide an improved capacitor-winding apparatus.

Another object of the invention is to provide improved apparatus for center winding a strip of capacitor-forming material to form capacitors.

With these and other objects in view, the invention contemplates the provision of a drum supported for rotation about a fixed axis for guiding a strip of dielectric metallized on both sides from a supply thereof and having a suction device for adhering successive portions of the strip to the drum and having a selectively operable air jet for releasing an end portion of the strip from the guide drum and transferring it onto a take-up drum located in a transfer position adjacent to the guide drum. The take-up drum which is provided with suction means for releasably retaining the end of the strip thereon is rotated to wind a measured length of the strip thereon and is then moved to an unwinding position in spaced relation to the guide drum and cooperates with the guide drum to support an intermediate portion of the strip in a predetermined position between the drums.

A slotted arbor having a pair of opposed arbor sections insulated from each other and engageable with the metal layers on opposite sides of the strip is mounted for rotation about an axis aligned with the intermediate portion of the strip and is moved axially to straddle the strip. The arbor is then rotated to wind thereon the portion of the strip on the take-up drum and a portion of the strip of equivalent length from the supply roll.

A metal removing device mounted adjacent the guide drum is then moved into engagement with the metallized strip to remove a section of the outside layer of metal thereon to isolate electrically the portion of the strip wound on the arbor from the strip supply. The capacitance of the isolated portion of the strip which is indicated by a meter connected to the arbor sections is slightly larger than required and the device is advanced around the guide drum to remove successive portions of the metal layer and thus progressively reduce the capacity of the isloated portion of the strip to a predetermined value at which time the device is stopped and returned to its starting position. The wound strip on the arbor is then severed from the supply and the ends of the severed strip are wound and secured to the capacitor, after which the arbor is retracted to remove the wound capacitor therefrom.

Other objects, advantages and novel aspects of the invention will become apparent upon consideration of the following detailed description in conjunction with the accompanying drawings, in which:

FIG. 1 is a front view front view of the capacitor-winding apparatus with portions thereof broken away;

FIGS. 2 and 3 are fragmentary vertical sectional views of the apparatus taken on lines 2—2 and 3—3, respectively, of FIG. 1;

FIG. 4 is a fragmentary horizontal sectional view of the apparatus taken on line 4—4 of FIG. 1;

FIG. 5 is a fragmentary vertical sectional view of the apparatus taken on line 5—5 of FIG. 1;

FIG. 6 is a fragmentary vertical sectional view of the apparatus taken on line 6—6 of FIG. 5;

FIG. 7 is a diagrammatic perspective view showing a portion of a metallized strip being wound into a capacitor;

FIG. 8 is a fragmentary view of the apparatus showing the metal removing device in engagement with the metallized strip;

FIG. 9 is a perspective view of the suction nozzle for a guide drum of the apparatus; and FIGS. 10 to 14 are diagrammatic views showing the apparatus in various stages of the operation of winding the metallized strip into a capacitor.

Figure 1:
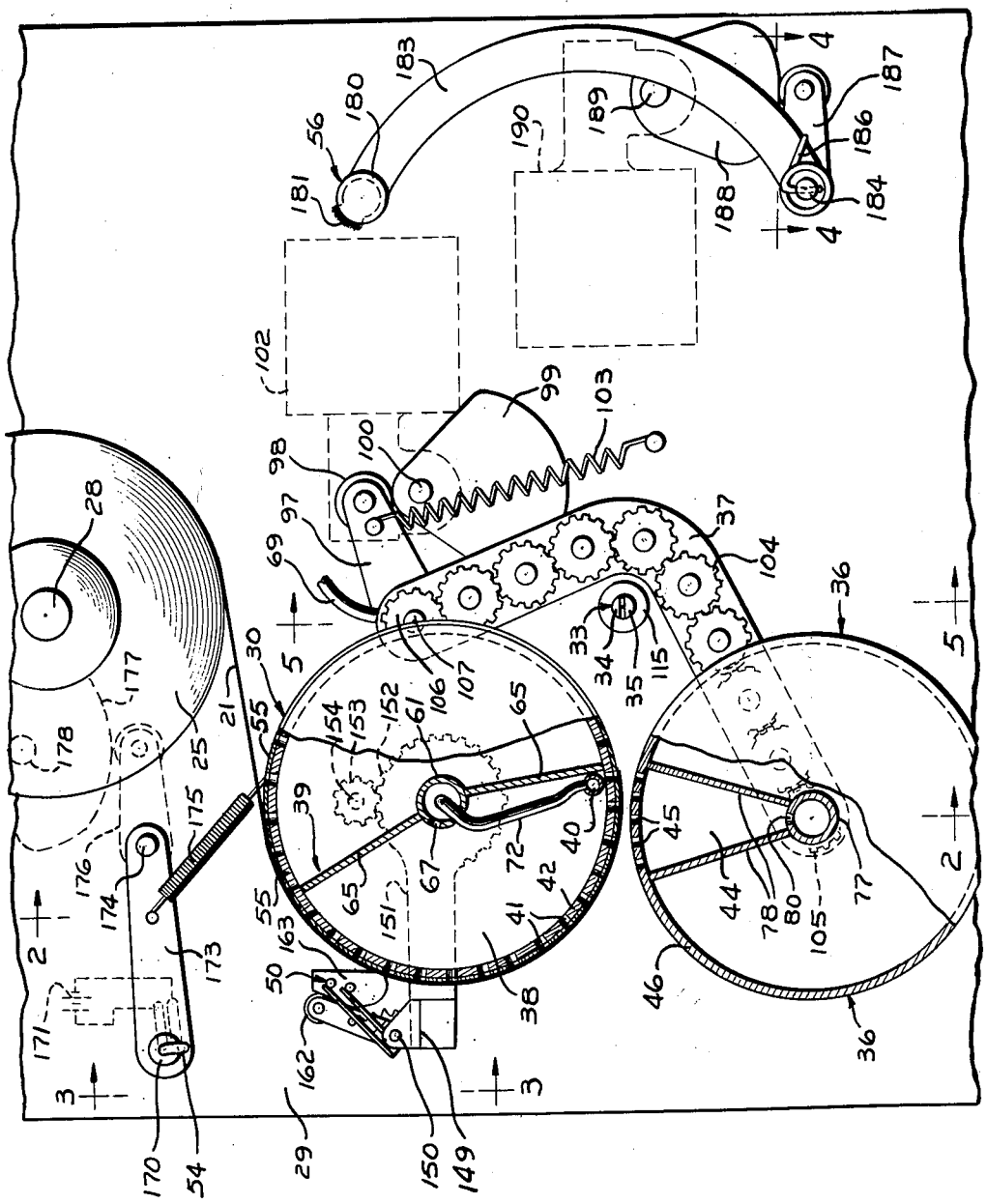

The present apparatus is designed to wind a capacitor 20 (FIG. 7) from a single metallized strip 21 comprising a dielectric web 22 having bands 23 of vaporized metal on opposite sides thereof. A supply roll 25 (FIG. 1) of the metallized strip 21 is supported on a spindle 28 secured to a vertical frame plate 29 of the apparatus above and adjacent to a guide drum 30. The drum 30 is supported on the frame plate 29 for rotation about a fixed horizontal axis above and to one side of a slotted arbor 33 having a pair of metal arbor sections 34 and 35 in spaced and insulated relation to each other. A take-up drum 36 is mounted on one end of an L-shaped arm 37 that is pivotally supported at its upper end on the frame plate 29 for movement to a first or transfer position below and adjacent to the guide drum 30 (FIGS. 1 and 10) and to a second or unwinding position (FIG. 11) on the opposite side of the arbor 33 and with the arbor disposed substantially midway between the drums.

The end portion of the strip 21 is withdrawn from the supply roll 25 and directed around the guide roll 30 and is yieldably held thereon by a suction created in a vacuum chamber 38 extending along a predetermined arcuate zone of the drum 30 and defined by a suction nozzle 39 (FIGS. 1 and 9). With the take-up drum 36 in its transfer position as shown in FIG. 1, jets of air selectively emitted from a nozzle 40 pass through apertures 41 in the outer cylindrical wall 42 of the drum 30 to release the end portion of the strip 21 from the drum 30 and transfer it to the periphery of the take-up drum 36.

The strip 21 is adhered to the drum 36 by suction applied thereto from a vacuum chamber 44 through perforations 45 in a predetermined zone of the outer cylindrical wall 46 of the drum 36. With the end of the strip 21 adhered thereto, the take-up drum 36 is rotated to wind thereon a measured length of the strip. The take-up drum 36 is then moved to the unwinding position (FIG. 11) with a portion of the strip 21 supported tangentially between the drums 30 and 36 and with a predetermined intermediate portion or midpoint of the strip to be wound into a capacitor disposed in axial alignment with the arbor 33 which is in the retracted position during this movement of the take-up drum 36.

The arbor 33 is then moved axially to its advanced position to straddle the midpoint of the strip 21, and is then rotated to wind thereon the portion of the strip supported on the take-up drum 36 and a portion of corresponding length from the supply roll 25. The rotation of the arbor 33 is stopped at a predetermined point short of the completion of the winding of the capacitor to position the strip 21 with the leading end thereof encircling a portion of the take-up drum 36 as shown in FIG. 7 and a corresponding portion of the strip encircling the guide drum 30.

A metal-removing device 50 mounted adjacent to the guide drum 30 is then moved into engagement with the outer layer 23 of metal of the strip 21, the device 50 extending across the entire width of the strip 21 and along a relatively short distance longitudinally thereof to vaporize and remove a section of the layer 23 of metal from the strip 21. This removal of a portion of the outer conducting layer 23 isolates electrically that portion of the wound strip 21 on one side of the removed portion of the layer 23 from the remaining portion of the strip connected to the supply roll 25 thereof. The capacitance of the wound capacitor and the strip 21 up to the removed portion of the metallized layer 23 is indicated on a capacitance measuring device 52 (FIG. 13) which is electrically connected to the arbor sections 34 and 35 and the metallized layers 23 of the capacitor being wound. The metal-removing device 50 is then moved circumferentially toward the bottom of the drum to remove successive portions of the outer metallic layer 23 to progressively reduce the capacitance of the wound capacitor 20. When the capacitance reaches a predetermined value, the metal-removing device 50 is stopped and separated from the strip 21.

A severing tool 54 in the form of a wire heated to a temperature sufficient to burn through the strip 21 is moved into engagement with the strip and pressed against the drum 30 (FIG. 14) to sever the strip 21 and separate the capacitor 20 from the strip supply. A resilient layer of dielectric material 55 encircling the outer cylindrical wall 42 of the drum 30 and having perforations therein aligned with the perforations in the wall 42 serves as a backing member cooperable with the severing tool 54 to effect the severance of the strip 21. The severing tool 54 is retracted after which the arbor 33 is rotated to wind the end portions of the severed strip 21 onto the capacitor 20.

Since the trailing end of the severed portion of the strip 21 is adhered to the guide drum 30 by the suction in the vacuum chamber 38, the trailing end of the strip, as it advances, imparts rotation to the guide drum 30 and thereby advances the leading edge of the following portion of the strip 21 to a position as shown in FIG. 14 to be engaged by the winding drum 36 during the next capacitor-winding cycle.

As the end portions of the severed section of the strip 21 are being wound onto the capacitor 20, a sealing device 56 is moved into engagement with the capacitor to apply adhesive to the periphery thereof to adhere and seal the ends of the strip 21 thereto. The sealing device 56 is then retracted after which the arbor 33 is retracted to eject the capacitor 20 therefrom.

Considering the apparatus in more detail and referring particularly to FIGS. 1 and 2, the perforated cylindrical wall 42 of the guide drum 30 is secured to a pair of circular end walls 58 and 59 which are centrally apertured for receiving a hollow shaft 61 on which the drum 30 is rotatably supported. The hollow shaft 61 is secured to the vertical frame plate 29 and has the suction nozzle 39 (FIG. 9) fixedly mounted thereon within the rotatable drum 30. The suction nozzle 39 comprises a pair of parallel sector shaped plates 63 positioned adjacent the end walls 58 and 59 of the drum 30 and connected to a pair of radially disposed walls 65.

One end portion of the hollow shaft 61 is provided with apertures 67 for establishing communication between the interior of the shaft and the vacuum chamber 38, and the hollow shaft 61 is connected at its other end to a vacuum line 69 for evacuating the atmosphere from the vacuum chamber.

The air nozzle 40 is connected to a supply line of compressed air 71 which extends longitudinally through a portion of the hollow shaft and has a laterally extending portion 72 in the vacuum chamber 38. Flow of air from the nozzle 40 is controlled by an electrically actuated valve 73 connected in the supply line 71. The valve 73 is stressed to a normal closed position and is electrically actuated to open position selectively by an electrical control unit 75 (FIG. 2) which serves to effect the sequential operation of the various components of the apparatus.

The take-up drum 36 includes a pair of centrally apertured parallel end walls 76 which are bonded to the cylindrical wall 46 and are fixedly secured to a hollow shaft 77 closed at both ends. The shaft 77 extends from the drum and is rotatably supported in one end of the L-shaped arm 37 which is hollow and has a passageway 79 formed therein. Apertures 80 and 81 in the hollow shaft 77 (FIG. 2) provide communication between the vacuum chamber 44 and the passageway 79, the latter being connected to the vacuum line 69 (FIG. 5). The air is evacuated continuously from the vacuum chambers 38 and 44 in the drums 30 and 36, respectively, while the apparatus is being operated.

At its upper end the arm 37 is secured to a sleeve 95 (FIG. 5) which is supported for oscillatory movement in the vertical frame plate 29. A lever 97 (FIG. 1) secured to the arm 37 adjacent the upper end thereof has a cam follower 98 engageable with a cam 99 for effecting the movement of the take-up drum 36 to and from the transfer and the unwinding positions. The cam 99 is secured to a shaft 100 which is supported in the vertical frame plate 29 and is rotated by a suitable drive including a motor 102. A spring 103 connected to the lever 97 maintains the cam follower 98 in engagement with the cam 99.

Rotation of the winding drum 36 is effected through a train of gears 104 (FIGS. 1 and 5), an end gear 105 (FIG. 2) of which is secured to the shaft 77 (FIG. 2). The other end gear 106 of the train of gears is secured to a shaft 107 which is rotatably supported in the sleeve 95 and is connected through a magnetic clutch 108 (FIG. 5) to a drive shaft 109. The drive shaft 109 is driven from a motor 110 and is connected to an adjustable counter 111 which may be preset to selected positions. The counter 111 cooperates with the control mechanism 75 to effect the selective operation of the motor 110 and the clutch 108 to rotate the take-up drum 36 and wind thereon a portion of the strip 21 of a preselected length equal to approximately one-half of the total length of the section of the strip to be wound onto the arbor to form the capacitor 20.

The arbor 33 is supported for rotation and for axial movement in a sleeve bearing 115 (FIG. 5) which is fixedly mounted in the vertical frame plate 29 and serves to eject the wound capacitor 20 from the arbor 33 when the arbor is moved to its retracted position. The arbor sections 34 and 35 are suitably connected electrically to the capacitance measuring device 52 (FIG. 13). At the rear end thereof, the arbor is swivelly connected to a piston rod 119 of a piston 120 slidably mounted in a cylinder 121 of a fluid operated actuator. Compressed air is admitted to opposite ends of the cylinder 121 by an electrically operated valve 123 selectively actuated by the control device 75 to effect the axial reciprocation of the arbor 33 to and from retracted and advanced positions.

A gear 127 splined to the arbor is held against axial movement by a frame member 128 and meshes with a gear 130 suitable supported for rotation (FIG. 5). The gear 130 is connected through a clutch 132 to a motor 134 for imparting rotation to the arbor 33. The clutch 132 includes a clutch control member 136 (FIG. 6) cooperable with a stop member 138 to effect the connection and disconnection of the drive to the arbor 33 and to stop the arbor with the slot between arbor sections 34 and 35 disposed in a predetermined substantially horizontal position in alignment with and parallel to the intermediate portion of the strip 21 supported between the drums 30 and 36 (FIG. 11). The stop member 138, pivotally supported at 139, is stressed to a normal operative position in engagement with the clutch member 136 to stop the arbor 33, and the member 138 is disengaged from the clutch member 136 by a solenoid 140 in reponse to selective energization thereof to effect the rotation of the arbor 33 and the winding of the strip 21 thereon.

A counter 141 (FIG. 5) settable to various positions is operatively connected to the gear 130 and cooperates with the control unit 75 to effect the rotation of the arbor at selected times through predetermined numbers of revolutions to wind the capacitor forming strip 21 thereon and to stop the arbor 33 prior to the completion of the winding operation so as to locate a predetermined section of the strip on the guide drum 30 in position to be acted on by the metal-removing device 50. The control unit 75 and the counter 141 also operate to effect the rotation of the arbor 33 at the proper time to wind the trailing ends of the severed portion of the strip onto the capacitor 20.

The metal-removing device 50 comprises a pair of electrodes 145 in the form of carbon rods (FIGS. 1, 3 and 8) which are secured to one end of each of a pair of flat springs 146 in parallel and spaced relation to each other. The flat springs 146 are secured at their other ends to a mounting bar 147 in insulated relation thereto and to each other, and the mounting bar 147 is supported on a carrier 149 for oscillatory movement about a pivot 150 (FIG. 1).

The carrier 149 is secured to one end of an arm 151 that is supported on the hollow shaft 61 (FIGS. 1 and 2) for oscillatory movement about the axis thereof. A gear segment 152 formed on an end portion of the arm 151 meshes with a pinion 153 on a shaft 154 which is rotatably supported on the frame plate 29 and is selectively rotated in opposite directions by a reversible motor 156 (FIG. 2) under control of the unit 75.

An arm 160 extending upwardly from the mounting bar 147 has a cam follower 162 thereon that is adapted to engage a stationary cam 163 for rocking the arm 160 and the mounting bar 147 to a predetermined position with the electrodes 145 spaced from the drum 30 and the strip 21 thereon when the metal-removing device 50 is moved to its normal upper position as shown in FIG. 1. In response to rotation of the motor 156 in one direction and the downward movement of the arm 151 and the metal-moving device 50, the cam follower 162 rides off of the cam 163 and a spring 165 connected to the arm 160 rocks the mounting bar 147 in a clockwise direction as viewed in FIGS. 1 and 8 to bring the electrodes 145 into engagement with the strip 21 on the drum.

The flat springs 146 and the electrodes 145 are connected to a battery 166 for supplying a potential to the electrodes 145 to cause the vaporization and removal of the metal layer positioned between the electrodes. When the device 50 has removed a sufficient portion of the metal layer 23 to reduce the capacitance of the capacitor to a predetermined value, a switch 167 associated with the capacity measuring device 52 (FIG. 13) and the control unit 75 is closed to effect the reversal of the motor 156 and the return of the metal-removing device 50 to its normal upper position with the electrodes 145 separated from the strip 21.

The strip severing tool 54 is in the form of a wire supported on an insulating rod 170 and connected to a battery 171, shown diagrammatically in FIG. 1, for heating the wire to incandescence. The tool 54 extends horizontally from one end of an arm 173 which is connected to a rock shaft 174 supported in the frame plate 29. The arm 173 is urged by a spring 175 in a counterclockwise direction as viewed in FIG. 1 to carry the severing tool 54 into engagement with the strip 21 to effect its severance. A lever 176 secured to the shaft 174 is actuated by a cam 177 that is mounted on a shaft 178 and controls the movement of the tool. The shaft 178 is driven by a motor 179 (FIG. 2) which is selectively activated by the control unit 75.

The sealing unit 56 includes a hollow container 180 (FIG. 1) for supporting a pad 181 saturated with adhesive solution and having an opening through which a portion of the pad projects for engagement with the capacitor 20 to apply adhesive thereto. The container 180 is mounted on the upper end of a curved arm 183, the lower end of which is pivotally supported on a rod 184 (FIGS. 1 and 4) fixed to the vertical frame plate 29. A torsion spring 186 having one end thereof secured to the rod 184 and the other end thereof engaging the arm 183 stresses the sealing unit 56 for movement in a counterclockwise direction as viewed in FIG. 1 into engagement with the capacitor 20. A lever 187 connected to the arm 183 is actuated by a cam 188 mounted on a shaft 189 that is supported in the frame plate 29. The shaft 189 is rotated by a motor 190 which is selectively operated by the control unit 75 to effect the movement of the sealing unit 56 into engagement with the capacitor 20 just prior to the completion of the winding of the ends of the strip 21 thereonto and to effect the sealing of the strip ends to the capacitor.

On completion of the winding of a capacitor 20 and the ejection of the capacitor from the arbor 33 as the arbor is retracted, the take-up drum 36 is located in its unwinding position (FIG. 14) and a substantial portion of the leading end of the strip 21 from the supply roll 25 is wrapped around the guide drum 30 and disposed in a predetermined position preparatory to the movement of the take-up drum 36 to the transfer position during the next cycle of operation of the apparatus. It will be understood that the operation of the apparatus is continuous and, as indicated hereinabove, that the various components of the apparatus are actuated in timed relation to one another under control of the control unit 75 to effect the automatic winding of successive capacitors.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a winding apparatus, a take-up drum, a guide member for guiding a strip from a supply thereof onto said take-up drum, means for rotating said take-up drum to wind a measured length of the strip thereon, an arbor, means for supporting said drum and said guide member on opposite sides of said arbor to support an intermediate portion of the strip in alignment with said arbor, means for moving said arbor into engagement with the intermediate portion of the strip to establish a winding connection therewith, means for rotating said arbor to wind the strip thereon, and means for severing the strip wound on said arbor.

2. In a winding apparatus, a guide drum for guiding a strip from a supply thereof, a take-up drum, mounting means for supporting said guide drum and said take-up drum for rotation in parallel relation to each other and for movement of one drum relative to the other to a first position in close proximity to each other and to a second position in spaced relation to each other, means for releasably retaining the strip to said guide drum for rotary movement therewith, means for releasing the strip from the guide drum and transferring it to said take-up drum in said first position, means on said take-up drum for releasably retaining the strip thereon, means for rotating said take-up drum to wind a measured length of the strip thereon, means for effecting relative movement between said drums from said first position to said second position to cause said drums to support an intermediate portion of the strip in a predetermined position therebetween, an arbor supported on said mounting means, means for moving said arbor into engagement with said intermediate portion of the strip to effect a winding connection therewith, and means for rotating said arbor.

3. In a winding apparatus, a slotted arbor, a guide drum disposed on one side of the arbor for guiding a strip from a supply thereof, a take-up drum disposed in an unwinding position on the other side of said arbor, mounting means for supporting said arbor and said guide drum for rotation respectively about fixed parallel axes and for movement of said take-up drum from said unwinding position to a transfer position in close proximity to said guide drum, means on said guide drum for releasably holding the strip thereon, means on said guide drum for releasing and transferring an end portion of the strip from said guide drum to said take-up drum, means on the take-up drum for releasably holding the end portion of the strip thereon, means for rotating said take-up drum to wind thereon a predetermined portion of the strip, means for moving said take-up drum to said unwinding position for cooperation with said guide drum to support an intermediate portion of said strip between said drums in alignment with said slotter arbor, means for moving the arbor axially to engage said intermediate portion of the strip, and means for rotating the arbor to center wind the strip thereon.

4. In an apparatus for center winding a strip, a guide drum for guiding the strip from a supply thereof, mounting means for supporting said guide drum for rotation about a fixed axis, a take-up drum supported on said mounting means for rotation in lateral and parallel relation to said guide drum and for movement relative thereto to a transfer position adjacent said guide drum and to an unwinding position spaced from said guide drum, means for releasably retaining the strip on said guide drum for movement therewith, means for releasing the strip from the guide drum and transferring a portion of the strip to said take-up drum, means on said take-up drum for releasably retaining the strip thereon, means for rotating said take-up drum to wind a measured length of the strip thereon, means for moving said take-up drum from said transfer position to said unwinding position to cause said drums to support an intermediate portion of the strip in a predetermined position therebetween, an arbor supported on said mounting means, means for moving said arbor into engagement with said intermediate portion of the strip to establish a winding connection therewith, means for rotating said arbor to wind the strip thereon, and means for severing the strip wound on said arbor.

5. In an apparatus for winding capacitors from a capacitor forming strip, a guide drum having a perforated cylindrical wall for guiding the strip from a supply thereof, mounting means for supporting the guide drum for rotation about a fixed axis, a take-up drum supported on said mounting means for rotation in lateral and parallel relation to said guide drum and for movement to a transfer position adjacent said guide drum and to an unwinding position spaced from said guide drum, means including a nozzle stationarily mounted within said guide drum and extending over a predetermined zone adjacent said perforated cylindrical wall for applying a suction thereto to adhere the strip to said guide drum, means disposed within said nozzle for directing jets of air through said perforated wall of said guide drum to transfer the strip from said guide drum to said take-up drum, means on said take-up drum for releasably retaining the strip thereon, means for rotating said take-up drum to wind a measured length of the strip thereon, means for moving said take-up drum from said transfer position to said unwinding position to cause said drums to support an intermediate portion of the strip in a predetermined position between the drums, a slotted arbor rotatably supported on said mounting means in alignment with the intermediate portion of the strip and for axial movement into engagement with said strip therewith, means for moving said arbor into engagement with the strip to establish a winding connection therewith, means for rotating said arbor to wind the strip thereon, and means for severing the strip wound on said arbor.

6. An apparatus for winding capacitors from a strip of dielectric having metallic layers on opposite sides thereof comprising, a guide drum for guiding the strip from a supply thereof, a take-up drum, mounting means for supporting said guide drum for rotation about a fixed axis and for supporting said take-up drum for rotation in lateral and parallel relation to said guide drum and for movement relative thereto to a first position adjacent to said guide drum and to a second position spaced from said guide drum, means for releasably adhering the strip to said guide drum, means for releasing the strip from the guide drum and transferring the strip to said take-up drum when said take-up drum is in said first position, means on said take-up drum for releasably retaining the strip thereon, means for rotating said take-up drum to wind a measured length of the strip thereon, means for moving said take-up drum from the first position to the second position to cause said drums to support an intermediate portion of the strip in a predetermined position therebetween, an arbor movably supported on said mounting means and having a pair of arbor sections in insulated relation to each other for straddling the strip and engageable with the metallic layers thereon, means for moving said arbor into engagement with said intermediate portion of the strip to establish a winding connection therewith, means for rotating said arbor to center wind the strip thereon, a device supported on said mounting means adjacent to said guide drum for removing a section of the outside metallic layer from the strip on said guide drum to isolate electrically the portion of the strip wound on the arbor from the strip supply, means electrically connected to the arbor sections for measuring the capacity of the portion of the strip wound on said arbor, means for moving said device into engagement with the strip at a predetermined point on said guide drum and along the periphery thereof to remove successive portions of the metallic layer of the strip, means for arresting the movement of said device when the capacity has reached a predetermined value, and means for severing the isolated portion of the strip.

7. In an apparatus for winding capacitors from a strip of dielectric material having metallic layers on opposite sides thereof, a hollow drum having a perforated cylindrical wall for guiding the strip from a supply thereof, mounting means for supporting said guide drum for rotation about a fixed axis, stationary means within said guide drum for applying a suction to the perforated cylindrical wall along a predetermined zone for releasably retaining the strip to said guide drum, a take-up drum supported on said mounting means for rotation in lateral and parallel relation to said guide drum and for movement relative thereto to a transfer position adjacent said guide drum and one extremity of said zone of suction and to an unwinding position spaced from said guide drum, means within said guide drum for effecting the release of the strip from the guide drum and transfer of the strip to said take-up drum, means on said take-up drum for releasably retaining the strip thereon, means for rotating said take-up drum to wind a measured length of the strip thereon, means for moving said take-up drum from the transfer position to the unwinding position to cause said drums to support an intermediate portion of the strip in a predetermined position therebetween, an arbor movably supported on said mounting means and having a pair of opposed arbor sections in spaced and insulated relation to each other for straddling the strip and engaging the metallic layers thereon, means for moving said arbor into engagement with said intermediate portion of the strip, means for rotating said arbor to center wind the strip thereon, a device supported on said mounting means adjacent to said guide drum for removing a section of the metallic layer from the strip on said guide drum to isolate electrically the portion of the strip wound on the arbor from the strip supply, means electrically connected to said arbor sections for measuring the capacity of the portion of the strip wound on said arbor, means for moving said device into engagement with the strip at a predetermined point on said guide drum and along the periphery thereof to remove successive portions of the metallic layer of the strip, means for arresting the movement of said device when the capacity of the isolated portion of the strip has reached a predetermined value, a strip severing member, and means for moving said severing member into engagement with the strip and against said guide drum for severing the strip at a point on said drum intermediate the extremities of said suction zone.

References Cited in the file of this patent

FOREIGN PATENTS 219,869    Australia _____ Jan. 22, 1959